Patented Aug. 24, 1948

2,447,763

UNITED STATES PATENT OFFICE 2,447,763

PROCESS FOR DETERMINING COLUMBIUM CARBIDE IN STAINLESS STEEL

Walter C. Maurer, McKeesport, Pa., assignor to Carnegie-Illinois Steel Corporation, a corporation of New Jersey No Drawing. Application January 22, 1945, Serial No. 574,036

5 Claims. (Cl. 23—230)

1

The present invention provides an improved method for the determination of columbium carbide in columbium-bearing stainless steels, wherein the columbium is present as columbium carbides. The object of the invention is the provision of an improved process characterized by simplicity and accuracy.

Generally speaking, the method of my invention comprises separating insoluble columbium carbide from the soluble columbium by digestion with sulphuric acid, and gravimetric determination of the final result.

My improved process is illustrated by the following procedure:

Prepare a sample of cuttings of the steel to be examined, fine enough to pass through a 20-mesh sieve. Weigh 2 grams of the sample and transfer to a 400 ml. beaker, add 100 ml. of water and 30 ml. sulphuric acid (sp. gr. 1.84). Cover the beaker with a watch glass and heat to just below the boiling point until the steel is completely dissolved, keeping the volume constant by water additions if necessary. Remove the beaker from the hot plate and filter immediately through a close texture filter paper, such as, for example, an 11 Cm. Whatman No. 42 filter paper, using some paper pulp. When the solution is filtered, allow the paper to drain entirely, and wash about five times with hot 2 per cent sulphuric acid, and twice with hot water. Transfer the paper containing the carbides to the original beaker, add 10 ml. perchloric acid (70–72%) and 3 ml. nitric acid (sp. gr. 1.42), and boil cautiously until the paper is oxidized, and continue boiling to heavy fumes for at least ten minutes. Remove the beaker from the hot plate and let cool. Dilute the solution in the beaker to 250 ml. with water, add 10 ml. hydrochloric acid (sp. gr. 1.18) and 35 ml. fresh sulphurous acid. Heat to the boiling point, and boil two minutes. Filter solution through a Whatman No. 42 filter paper using a little paper pulp, and wash at least five times with hot 5 per cent hydrochloric acid. Discard filtrate.

Transfer the filter paper to a platinum crucible, ignite slowly, and finally to 1600° F. Treat the residue in the platinum crucible with 2 ml. hydrofluoric acid and 2 ml. sulphuric acid (sp. gr. 1.84). Place crucible on edge of hot plate and heat carefully to prevent spattering, continue to heat in the center of the hot plate until all of the fluorine is expelled, and strong $SO_3$ fumes evolve. Remove crucible from hot plate, and let cool. Wash contents of the crucible back into the original beaker, and warm with 2 per cent hydrochloric acid, scrubbing the crucible with a moist piece of filter paper. Dilute solution to 100 ml. with 2 per cent hydrochloric acid, add 20 ml. sulphurous acid, and boil one minute. Filter through a No. 42 Whatman filter paper, using a little paper pulp and wash five times with 2 per cent hydrochloric acid. Discard filtrate. Transfer paper to original crucible and ignite to constant weight at 1900° F. and weigh as $Cb_2O_5$.

The columbium present is found by the formula:

$$\frac{\text{wt. } Cb_2O_5 \times .70 \times 100}{\text{wt. of sample}} = \text{per cent Cb}$$

This determined percentage of columbium is converted into percentage of columbium carbide by dividing the percentage of columbium by eight to give the percentage of carbon tied up with the columbium as columbium carbide.

I claim:

1. The process of determining columbium originally present as columbium carbide in columbium-bearing stainless steels, which comprises dissolving a weighed sample of the steel in sulphuric acid, thus leaving the columbium carbide contained therein in an insoluble residue, filtering the resulting solution, thereby collecting the insoluble residue, removing entrained soluble salts from the said residue, oxidizing the said residue and converting the columbium carbide therein to columbium oxide, treating the columbium oxide with dilute hydrochloric acid in the presence of sulphurous acid, collecting the resulting extracted columbium oxide containing silica from the silicon present in original sample of steel, removing the silica by extraction of the columbium oxide with hydrofluoric acid in the presence of sulphuric acid, collecting the remaining columbium oxide, igniting the said columbium oxide, and weighing the ignited oxide.

2. The process of determining columbium carbide in columbium-bearing stainless steels, which comprises dissolving a weighed sample of the steel in sulphuric acid thus leaving the columbium contained in the steel as columbium carbide in an insoluble residue, filtering the resulting solution, thereby collecting the insoluble residue, washing the collected residue until free from iron and other soluble salts, oxidizing the residue with perchloric acid and nitric acid until both filter paper and residue thereon are oxidized, diluting the resulting solution, adding to the diluted solution hydrochloric acid and sulphurous acid, filtering the resulting solution, thereby collecting insoluble materials, washing the resulting collected materials with dilute hydrochloric acid, igniting the washed materials, extracting the resulting ignited material with hydrofluoric acid and sulphuric acid, heating until strong fumes of sulphur trioxide evolve, diluting the resulting solution, treating the solution with hydrochloric acid and sulphurous acid, filtering the thus-treated solution, igniting collected solids from the said filtering, and weighing the ignited solids as columbium oxide.

3. The process of determining columbium originally present as columbium carbide in columbium-bearing stainless steels, which comprises the following steps in the indicated sequence and employing reagents in substantially the indicated proportions and concentrations: preparing a sample of fine cuttings of the steel which passes through a 20 mesh sieve, weighing two grams of the sample, transferring the weighed sample to a suitable beaker, adding 100 ml. water and 30 ml. sulphuric acid of specific gravity 1.84, heating until the sample has dissolved with the exception of insoluble material including columbium carbide, filtering through a close textured filter paper in the presence of filter pulp, oxidizing the filter paper and contents by transferring the paper and contents to the original beaker and adding 10 ml. of 70 to 72% perchloric acid, 3 ml. nitric acid of specific gravity 1.42, boiling until heavy fumes are evolved, cooling, adding 250 ml. water to the beaker and 10 ml. hydrochloric acid specific gravity 1.18, then 35 ml. sulphurous acid, boiling for two minutes, filtering through a close filter paper in the presence of filter pulp, repeatedly washing the filter paper and contents with hot five per cent hydrochloric acid, transferring the filter paper and contents to a platinum crucible, igniting the paper, and finally heating the crucible and contents to approximately 1600° F., treating the resulting residue in the crucible with 2 ml. hydrofluoric acid and 2 ml. sulphuric acid of specific gravity 1.84, heating the crucible and contents until all fluorine is expelled and strong sulphur trioxide fumes evolve, washing the contents of the crucible back into the original beaker with warm 2 per cent hydrochloric acid, scrubbing the crucible with a moist piece of filter paper, diluting the resulting solution to 100 ml. 2 per cent hydrochloric acid, add 20 ml. sulphurous acid, boil for one minute, filtering through a close texture filter paper, washing the filtered solids five times with hot 2 per cent hydrochloric acid, transferring the filter paper and solids to the original crucible, igniting them to constant weight at 1900° F., and weighing the ignited solids as columbium oxide.

4. In the determination of columbium carbide in columbium-bearing stainless steels, which comprises dissolving a weighed sample of the stainless steel in dilute sulphuric acid, thereby leaving the columbium carbide present in the steel as residue insoluble in the said sulphuric acid.

5. In the determination of columbium carbide in columbium-bearing stainless steels, the improvement which consists in dissolving a weighed sample of the stainless steel in dilute sulphuric acid prepared by mixing 30 ml. of sulphuric acid of sp. gr. 1.84 with 100 ml. of water, thereby leaving the columbium carbide as a filterable residue insoluble in the said sulphuric acid.

WALTER C. MAURER.

REFERENCES CITED

The following references are of record in the file of this patent:

A. S. T. M., Methods of Chemical Analysis of Metals (1943), pp. 79–82.